(12) United States Patent
Ishikura

(10) Patent No.: US 8,691,085 B2
(45) Date of Patent: Apr. 8, 2014

(54) OIL FILTERING DEVICE

(75) Inventor: Hideo Ishikura, Taichung (TW)

(73) Assignee: Insonic Company, Taipei (TW)

( * ) Notice: Subject to any disclaimer, the term of this patent is extended or adjusted under 35 U.S.C. 154(b) by 198 days.

(21) Appl. No.: 13/272,280

(22) Filed: Oct. 13, 2011

(65) Prior Publication Data

US 2012/0261324 A1 Oct. 18, 2012

(30) Foreign Application Priority Data

Apr. 12, 2011 (TW) .............................. 100206333 U

(51) Int. Cl.
| | |
|---|---|
| *B01D 27/10* | (2006.01) |
| *B01D 27/06* | (2006.01) |
| *B01D 27/14* | (2006.01) |
| *B01D 35/147* | (2006.01) |
| *B01D 35/153* | (2006.01) |
| *B01D 35/00* | (2006.01) |

(52) U.S. Cl.
USPC ........... 210/130; 210/136; 210/314; 210/316; 210/435; 210/437; 210/440; 210/443; 210/450; 210/457; 210/493.1; 210/493.2

(58) Field of Classification Search
None
See application file for complete search history.

(56) References Cited

U.S. PATENT DOCUMENTS

| | | | | |
|---|---|---|---|---|
| 3,722,683 | A | * | 3/1973 | Shaltis et al. ................. 210/132 |
| 5,584,987 | A | * | 12/1996 | Mules ............................ 210/130 |
| 6,375,836 | B1 | * | 4/2002 | Yano et al. ..................... 210/130 |
| 2003/0106848 | A1 | * | 6/2003 | Oohashi et al. ............... 210/130 |

* cited by examiner

*Primary Examiner* — Benjamin Kurtz
(74) *Attorney, Agent, or Firm* — Rosenberg, Klein & Lee

(57) ABSTRACT

The present invention relates to a filtering device, which comprises a base plate (12) having a threaded center hole (122); a filter housing (11) having a cap-shaped body coupleable to the base plate; an anti-drainback valve (15) having a valve hole (151) defined in the center portion thereof arranged on the base plate (12), where the valve hole (151) correspondingly aligns with the threaded center hole (122) of the base plate (12); a filter assembly (14) having a filter hole (1411) abutting on the anti-drainback valve (15), where the filter hole (1411) aligns with the valve hole (151) of the anti-drainback valve (15); and a bypass valve (13) having a central plate portion (132) and a pair of extending wing portions (131) pressingly arranged between the inner surface of the filter housing and the filter assembly. The separately removable housing (11) provides easy assembly and enables simple filter media replacement.

14 Claims, 6 Drawing Sheets

OIL FILTERING DEVICE

BACKGROUND OF THE INVENTION

1. Field of the Invention

The present invention relates to an oil filtering device, and more particularly, to an oil filtering device having separately removable housing that enables simple filter media replacement.

2. Description of Related Art

Modern combustion engine-equipped power systems utilize oil filter to remove contaminants from the fuel system for ensuring the proper operation and prolonging the working life of the equipment parts.

However, conventional oil filter devices are often of single-use disposable construction. When the occasion rises for filter replacement, the entire filter unit, which is often clogged with oil contaminants and debris, has to be removed and replaced. Special care is required in disposing/recycling these oil-clogged wastes, or they may create serious hazard to our environment.

SUMMARY OF THE INVENTION

Embodiments of the present invention provide an oil filter device having a reusable housing structure capable of easy filter media replacement. The reusable housing structure of the instantly disclosed oil filter device may reduce the environmentally unfriendly contaminated waste problem of the conventional disposable filters.

One embodiment in accordance with the present invention provides an oil filtering device comprising a filter housing (11), a bypass valve (13), a filter assembly (14), an anti-drainback valve (15), and a base plate (12).

The base plate (12) has a threaded center hole (122) and a threaded side wall (126).

The filter housing (11) has a cap-shaped body defining an opening. The inner surface (111) of the filter housing (11) is threaded around the opening for sealingly coupling the threaded side wall (126) of the base plate (12).

The anti-drainback valve (15) has a valve hole (151) defined in the center portion thereof, and is arranged on the base plate (12) in the receiving space (113). The valve hole (151) correspondingly aligns with the threaded center hole (122) of the base plate (12).

The filter assembly (14) has a filter hole (1411) abutting on the anti-drainback valve (15) and is received in the receiving space (113). The filter hole (1411) aligns with the valve hole (151) of the anti-drainback valve (15).

The bypass valve (13) includes a central plate portion (132) and a pair of extending wing portions (131), and is pressingly arranged between the inner surface (111) of the filter housing (11) and the filter assembly (14). The central plate portion (132) establishes pressing contact with the filter assembly (14), and the extending wing portions (131) establishes pressing contact with the inner surface (111) of the filter housing (11)

The removable design of the filter housing (11) from the base plate (12) enables easy replacement of the filter assembly (14) in the oil filter device (1) in accordance with the present invention. The reusable housing structure of the oil filter device is more cost effective and environmental friendly.

In order to further the understanding regarding the present invention, the following embodiments are provided along with illustrations to facilitate the disclosure of the present invention.

DETAILED DESCRIPTION OF THE PREFERRED EMBODIMENTS

The aforementioned illustrations and following detailed descriptions are exemplary for the purpose of further explaining the scope of the present invention. Other objectives and advantages related to the present invention will be illustrated in the subsequent descriptions and appended drawings.

Figure 1:
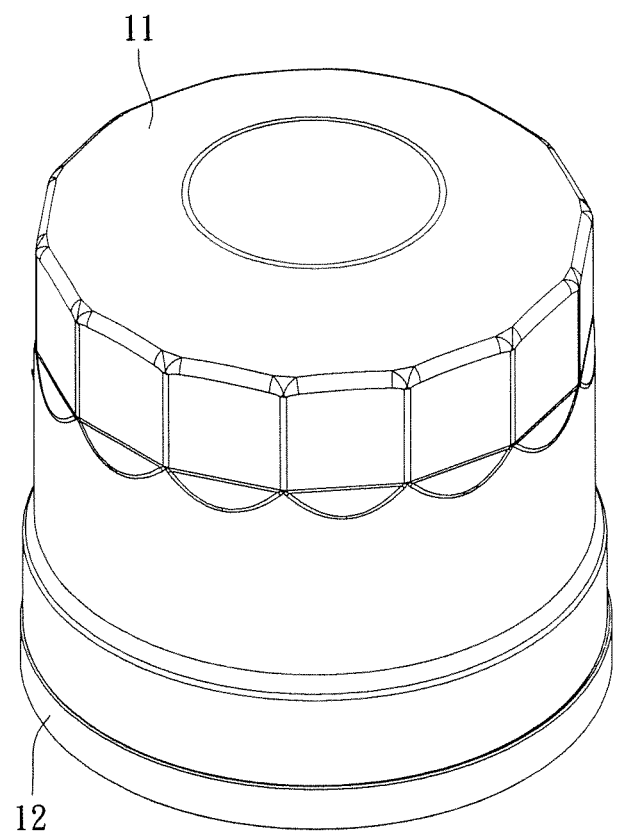
FIG. 1 shows a perspective view of an oil filtering device in accordance with the present invention.
Figure 2:
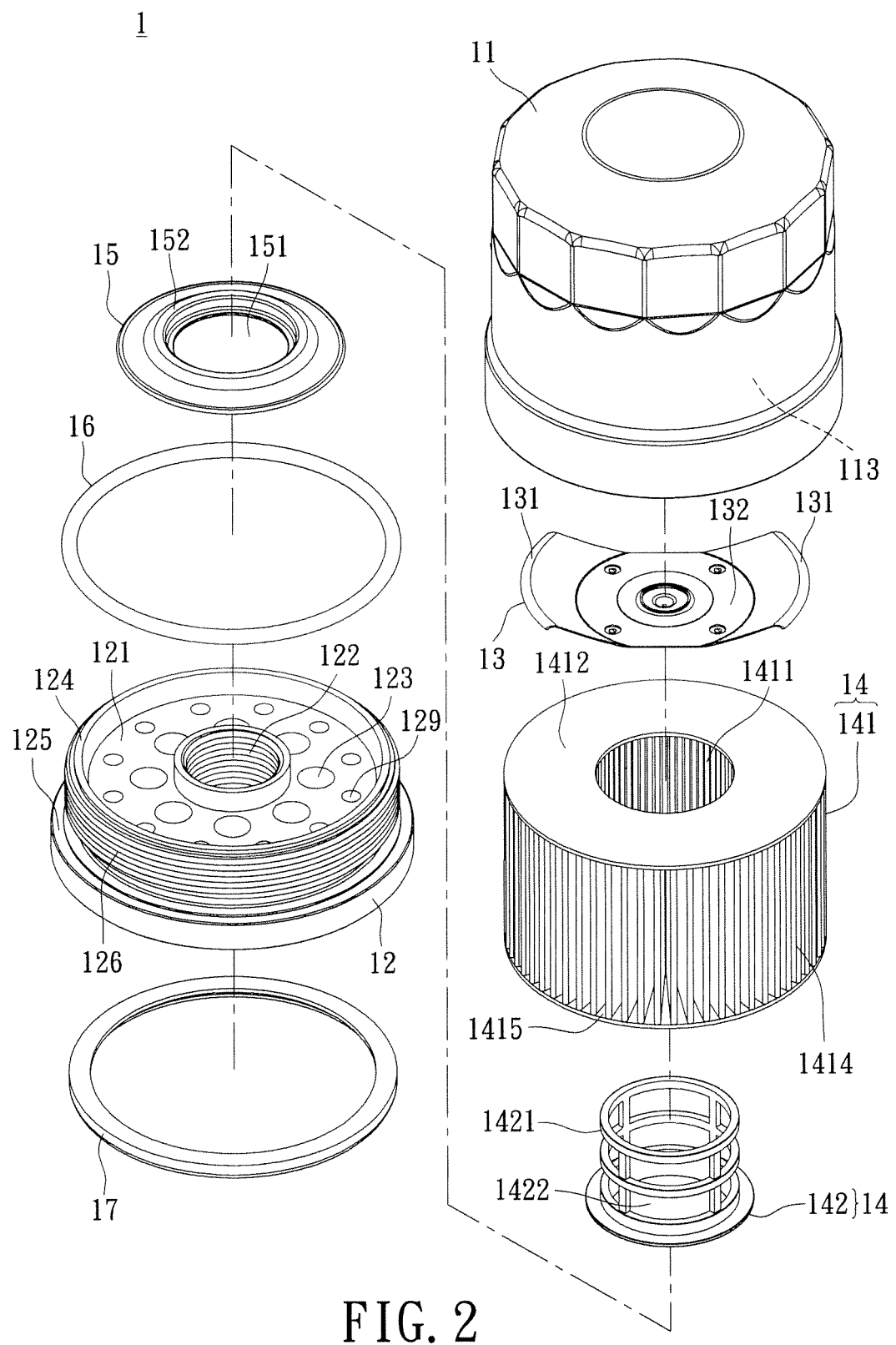
FIG. 2 shows a perspective exploded diagram of the oil filtering device in accordance with the present invention.
Figure 3:
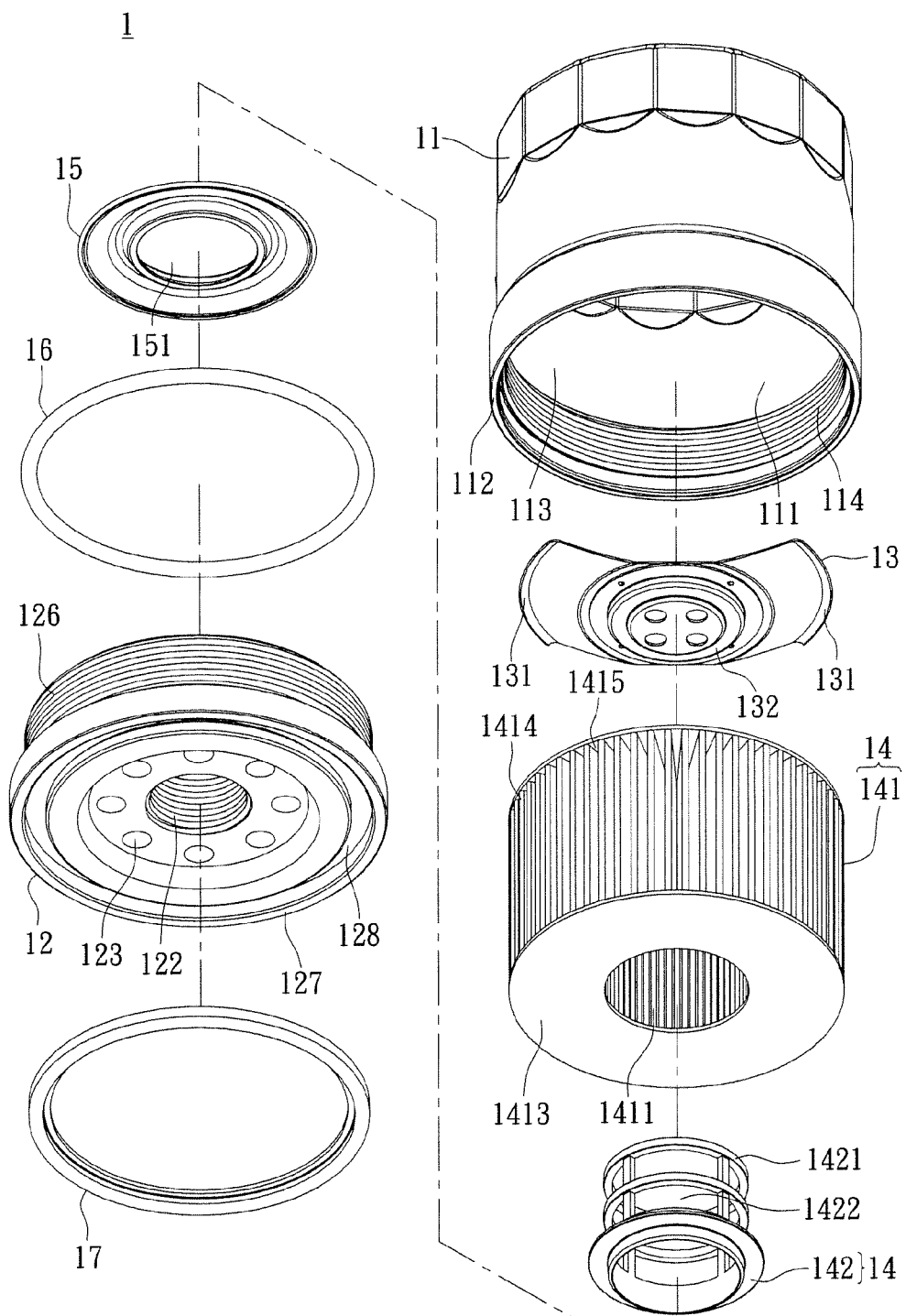
FIG. 3 shows a perspective exploded diagram of the oil filtering device in accordance with the present invention from another angle.

Referring concurrently to FIGS. 1, 2, and 3. The oil filtering device (1) in accordance with the present invention comprises a filter housing (11), a bypass valve (13), a filter assembly (14), an anti-drainback valve (15), an O-ring (16), and a base plate (12). The filter housing (11) has a cup-shaped body defining an inner surface (111) and an opening (112). The inner surface (111) surroundingly defines a receiving space (113). A threaded portion (114) is arranged on the inner surface (111) of the filter housing (11) approximate the opening (112) thereof. The bypass valve (13) has a central plate portion (132) and a pair of extending wing portions (131). The bypass valve (13) is arranged in the receiving space (113).

The filter assembly (14) includes a generally cylindrical body having a first end surface 1412 and an opposing second end surface (1413). A filter hole (1411) is arranged on the end surfaces defining a core channel that enables fluid passage from one end of the filter assembly to the other. The filter assembly (14) is arranged in the receiving space (113). The bypass valve (13) is arranged between the inner surface (111) of the filter housing (11) and the filter assembly (14). Particularly, the extended wing portions (131) of the bypass valve (13) abut on the inner surface (111) of the filter housing (11), while the central plate portion (132) of the bypass valve (13) abuts on the first end surface (1412) of the filter assembly (14) in corresponding alignment with the filter hole (1411).

The anti-drainback valve (15) has an annular protruding portion (152) surroundingly defining a corresponding valve hole (151). The valve hole (151) is arranged in alignment with the filter hole (1411) of the filter assembly (14). The annular protruding portion (152) is insertable into the filter hole (1411) of the filter assembly (14) to create tight seal and prevent backflow of dirty oil. The anti-drainback valve (15) is abuttingly arranged between the second end surface (1413) of the filter assembly (14) and base plate (12), and is received in the receiving space (113).

The base plate (12) is a substantially base having a annular side wall (124) with threads (126) arranged thereon for sealingly coupling the filter housing (11). The base plate (12) has a threaded center outlet hole (the center hole) (122) arranged in alignment with the valve hole (151) of the anti-drainback valve (15) upon assembly. An annular groove (121) is arranged around the center hole (122). The concaved surface of the annular groove (121) is perforated with a plurality of outlet holes (123). The outer bottom portion of the side wall (124) further defines a flange structure (125). An O-ring (16) is disposed around the side wall (124) approximate the flange (125) for ensuring sealing engagement between the filter housing (11) and the base plate (12) upon assembly. The annular groove (121) may further incorporate a plurality of radially arranged tool insertion holes (129) between the inlet holes (123) and the side wall (124) that are capable of receiving the teeth of a special tool (not shown) for establishing firm grip during the spin-on (/spin-off) operation of the base plate (12) onto (/off from) a filter mounting seat of a motor vehicle, thus enabling easier assembly (/disassembly) of the filter device (1). Thus, during the replacement of the filter assembly, a person only needs to spin-off the filter housing (11) from the filter device (1) without removing the base plate (12) from the filter mounting seat. This partially removable design may provide significant increase in convenience for maintenance personnel during oil change operations.

Due to the utilization of the separately removable filter housing (11), the filter assembly (14) may be conveniently accessible through spin-off removal of the filter housing (11) from the base plate (12). The easy accessibility provided by the embodiments of the present invention enables easy recycling of the filter assembly (14) and thus contributes to the reduction of potential environmental hazard.

Figure 4:
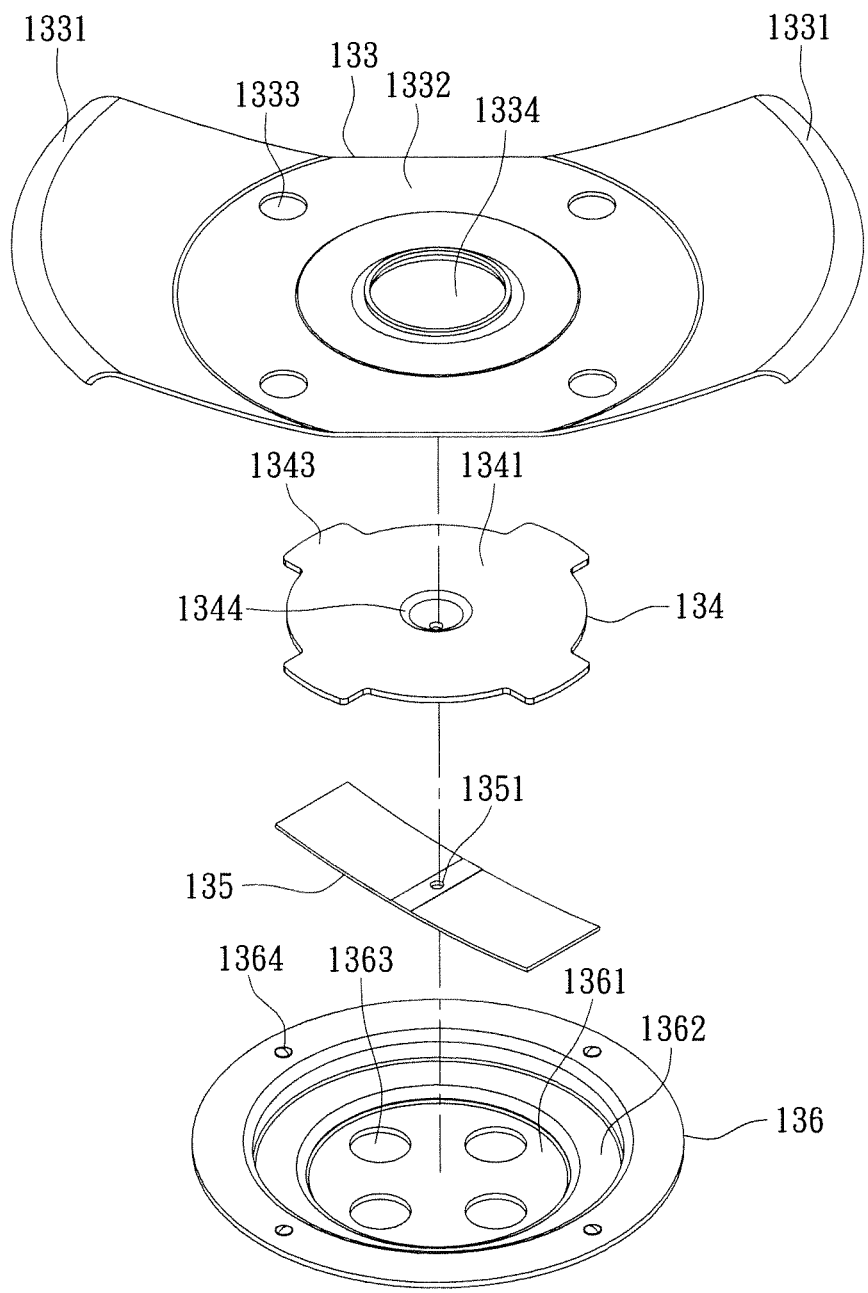
FIG. 4 shows a perspective exploded diagram of the bypass valve of the oil filtering device in accordance with the present invention.
Figure 5:
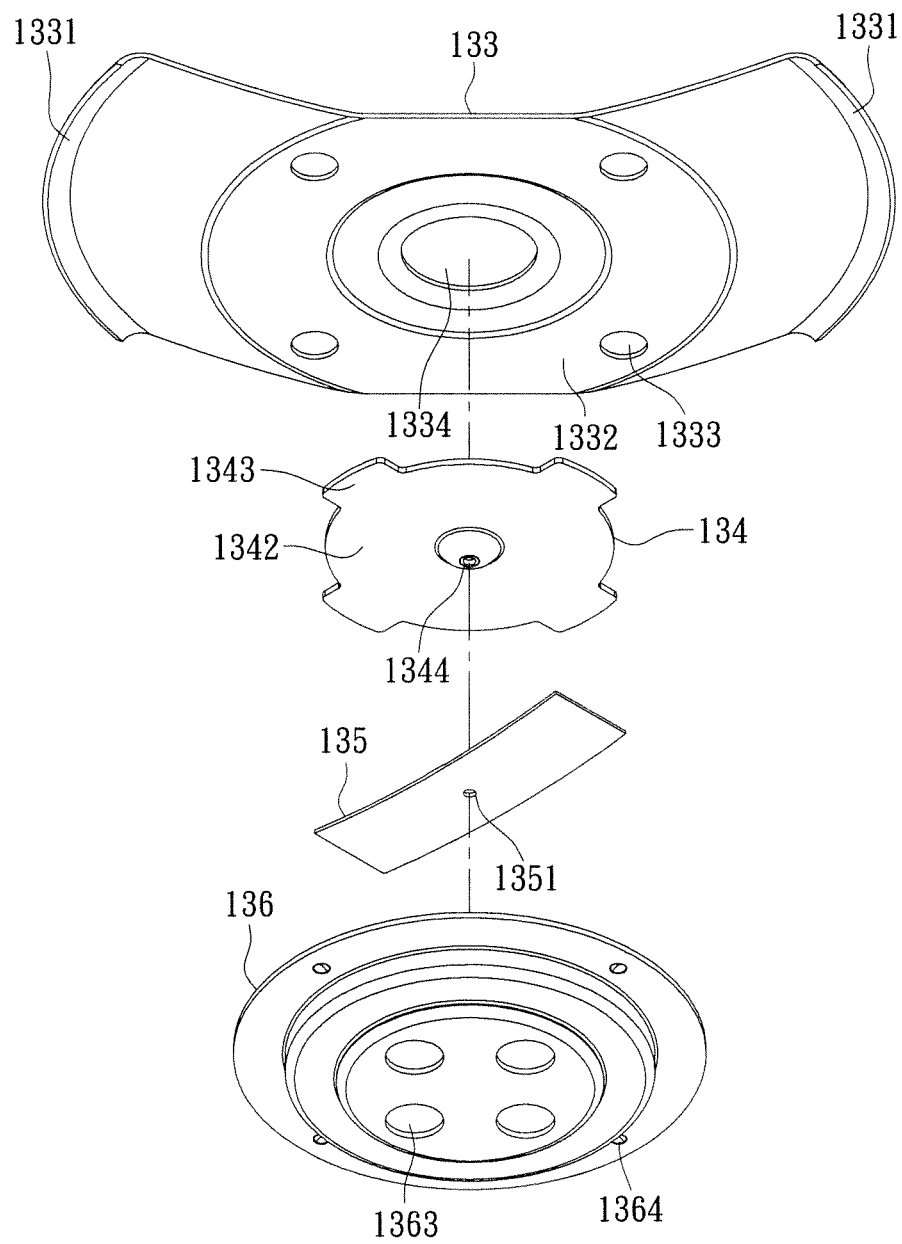
FIG. 5 shows a perspective exploded diagram of the bypass valve of the oil filtering device in accordance with the present invention from another angle.

Referring to FIGS. 4 and 5, the bypass valve (13) comprises a pressure plate (133), a cover plate (134), an elongated leaf spring member (135) and a bottom valve plate (136). The cover plate (134) and the leaf spring member (135) are sandwiched between the pressure plate (133) and the bottom valve plate (136). The function of the bypass valve (13) is that, after a prolonged period of use, contaminating particles may build up in the filtering device (1) (particularly in the filter media (141) of the filter assembly), until a point is reached where oil can't flow through it. The flow blockage will result in the build-up of oil pressure inside the filtering device, which may cause damage to the internal components thereof. The bypass valve (13) implemented herein is designed to open in such occasion to create a bypass flow-channel for alleviating the internal pressure build-up problem, thus maintaining proper oil pressure inside the filtering device to ensure the longevity of the filter unit. The structural detail of the bypass valve (13) will be further discussed below.

The pressure plate (133) is a substantially U-shaped leaf spring member having a central portion (1332) and a pair of extending portions (1331). Upon assembly, the extending portions (1331) will establish pressing contact with the inner surface (111) of the filter housing (11), while the central portion (1332) establishes abutting contact with the top surface (1341) of the cover plate (134).

In further detail, the central portion (1332) of the pressure plate (133) includes a substantially planar portion that enables wide area contact with the top surface (1341) of the cover plate (134). The pair of extending portions (1331) of the pressure plate (133) tiltingly extends from the planar central portion (1332), where the end portion of each extending portion (1331) may establish pressing contact with the inner surface (111) of the filter housing (11), as shown in FIG. 3. The pressure plate (134) further includes a central plate hole (1334) and a plurality of positioning holes (1333) defined thereon, whose functions will be discussed below.

The bottom valve plate (136) has a step-like cavity (1361) defined on the central portion thereof, where the intermediate step portion thereof defines a supporting surface (1362) for supporting the two ends of the leaf spring member (135). The cover plate (134) is preferably a circular plate with at least one pair of radially extending protruding portions (1343) arranged on the circumference thereof. Upon assembly, the protruding portions (1343) may firmly press the two ends of the leaf spring member (135) onto the supporting surface (1362), thereby securely retaining the leaf spring member (135) between the cover plate (134) and the bottom valve plate (136).

The center portion of the bottom valve plate (136) has a plurality of perforated holes (1363) defined thereon correspondingly arranged to enable fluid passage to the filter hole (1411) of the filter assembly (14). The filter-facing side of the bottom valve plate (136) is protrudingly structured and insertable into the filter hole (1411). The bottom valve plate (136) may further include a plurality of positioning members (1364) around the edge portion thereof arranged in corresponding alignment with the positioning holes (1333) of the pressure plate (133). For the assembly of the bypass valve (13), the leaf spring (135) and the cover plate (134) are first placed in the cavity (1361) of the bottom base plate (136). Then, the pressure plate (133) is aligningly placed on the bottom valve plate (136) with the positioning holes (1333) thereof correspondingly line up with the positioning members (1364). The pressure plate (133) and the bottom valve plate (136) are then structurally joined through soldering or riveting around the area proximate the positioning members (1364) to complete the assembly of the bypass valve (13).

Generally, part of the contaminated fluid that enters the oil filter device (1) from the inlet holes (123) of the base plate (12) may flow through the filter media (141) of the filter assembly (14) then enter the central plate hole (1334) of the pressure plate (133). The fluid may sequentially flow pass a cover plate hole (1344) defined on the central portion of the cover plate (134) and a center spring hole (1351) defined on the leaf spring member (135), then subsequently exit the bypass valve (13) through the perforated holes (1363) of the bottom valve plate (136) and into the core channel defined in the filter assembly (14). However, after a prolonged period of use, contaminating particles may build up in the filtering device (1), particularly in the filter media (141) of the filter assembly, until a point is reached where oil can't flow through it. The flow blockage will result in the build-up of oil pressure inside the filtering device, which may cause damage to the internal components thereof. Due to the raising pressure, the leaf spring member (135) of the bypass valve (13) will be urged/biased away from the cover plate (134) to create a greater bypass flow-channel for alleviating the internal pressure build-up problem, thus maintaining proper oil pressure inside the filtering device to prevent damage to the internal components of the filtering device due to excessive level of internal pressure.

Comparing with conventional bypass valves that employ linear coil springs whose structure are often complicated and thus unfriendly to mass production, the bypass valve (13) in accordance with the present invention is structurally simple and low profile, which may contribute to the simplification of assembly process and facilitate the reduction of manufacturing cost.

Figure 6:
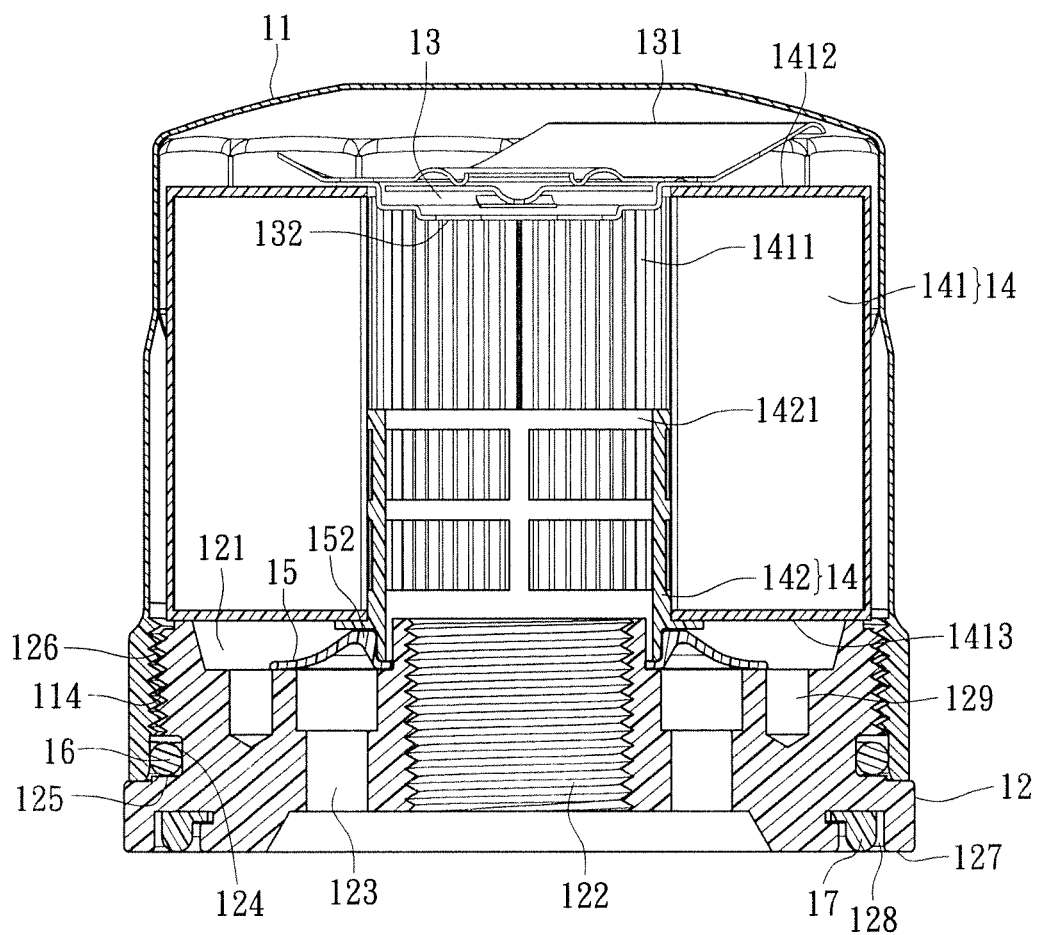
FIG. 6 shows a longitudinal cross sectional view of the oil filtering device in accordance with the present invention.

Referring to FIGS. 2 and 6, the filter assembly (14) comprises a louvered inner core member (141) and a centrally-hollowed filter media (141). The filter media (141) comprises a plurality of radially displaced and substantially equally spaced fin members (141). The louvered inner core member (142) has one end inserted in the hollow core of the filter media (141) and the other end abuttingly coupled to the annular protruding portion (152) of the anti-drainback valve (15) in alignment with the valve hole (151).

Each pair of the neighboring fin members (1414) defines a fluid channel (1415) that provides passage of the inlet fluid (often the contaminated fluid) through the filter media (141). Comparing with conventional filter elements that employ metal plates on their end surfaces, which may hinder the filtering ability of the filter unit, the filter assembly (14) in accordance with the present invention utilizes filter papers for the fin members (1414) and filter cottons for the first and second end surfaces (1412/1413) for improved filtering efficiency.

The louvered inner core member (142) comprises a frame-like louvered structure (1421) that defines a plurality of louvered passages (1422), which enables fluid passage from the fluid channels (1415) between the fin members (1414) to the central channel defined by the filter hole (1411) inside the filter assembly (14). The louvered inner core member (142) is inserted into the filter hole (1411) upon assembly to provide additional structural support for the filter assembly (14), preventing structural deformation/collapse of the filter media due to internal fluid pressure and/or prolonged use.

As shown in FIGS. 2 and 6, the filtering device of the instant embodiment further comprises an annular gasket (17) arranged on the external surface (127) of the base plate (12). Specifically, the gasket (17) of the instant embodiment is disposed in a gasket receiving groove (128) defined on the external (bottom) surface (127) of the base plate (12) and encircling the plurality of inlet holes (123). The gasket (17) may establish fluid-tight seal upon installation of the filtering device (1) onto a filter mounting seat (not shown) through spin-on coupling of the threaded center hole (122).

Please refer back to FIGS. 2 and 3. When the filtering device (1) is incorporated into a fluid system (not shown), the flow of fluid may enter the filter device (1) through the inlet holes (123). The fluid may then flow from the outside of the filter assembly (14) through the filter media (141) into the core channel defined by the filter hole (1411), where the contaminating particles suspended therein can be trapped and filtered, then finally exit the filtering device (1) through the central outlet hole (122) and flow back into the fluid system. However, after a prolonged period of use, contaminating particles may build up in the filtering device (1) and permanently compromise the filtering capability of the filtering device. To restore the filtering capability of the filtering device (1), a person simply needs to spin-off the filter housing (11) from the filter device (1) to replace the filter assembly (14) without removing the base plate (12) from a filter mounting seat. This partially removable design may provide significant increase in convenience for maintenance personnel during oil change operations. Because of the utilization of the separately removable filter housing (11), the filter assembly (14) may be conveniently accessible through spin-off removal of the filter housing (11) from the base plate (12). The easy accessibility provided by the embodiments of the present invention enables easy recycling of the filter assembly (14) and thus contributes to the reduction of potential environmental hazard In conclusion, the oil filtering device in accordance with the present invention utilizes a separately removable housing that enables simple filter media replacement and recycling. In addition, the simple structural design of the instantly disclosed filtering device not only provides reduced physical profile but also allows easy unit assembly, which is suitable for mass production at lower manufacturing costs.

The descriptions illustrated supra set forth simply the preferred embodiments of the present invention; however, the characteristics of the present invention are by no means restricted thereto. All changes, alternations, or modifications conveniently considered by those skilled in the art are deemed to be encompassed within the scope of the present invention delineated by the following claims.

What is claimed is:

1. A filtering device, comprising:
    a base plate (12) having a threaded center hole (122) and a threaded side wall (124);
    a filter housing (11) having a cap-shaped body defining an opening,
        wherein the inner surface (111) of the filter housing (11) is threaded around the opening for sealingly coupling the threaded side wall (126) of the base plate (12);
        wherein the filter housing (11) and the base plate (12) cooperatively defines a receiving space (113);
    an anti-drainback valve (15) having a valve hole (151) defined in the center portion thereof arranged on the base plate (12) in the receiving space (113),
        wherein the valve hole (151) correspondingly aligns with the threaded center hole (122) of the base plate (12);
    a filter assembly (14) having a filter hole (1411) abutting on the anti-drainback valve (15), a centrally-hollowed filter media (141), a compact louvered inner core member (142) removably inserted into filter hole (1411), a first filtering cottoned end surface (1412) and a second filtering cottoned end surface (1413) arranged on two opposite ends of the filter media (141), the filter assembly (14) received in the receiving space (113),
        wherein the filter hole (1411) aligns with the valve hole (151) of the anti-drainback valve (15); and
    a bypass valve (13) having a central plate portion (132) and a pair of extending wing portions (131) pressingly arranged between the inner surface (111) of the filter housing (11) and the filter assembly (14);
        wherein the central plate portion (132) establishes pressing contact with the filter assembly (14),
        wherein the extending wing portions (131) establishes pressing contact with the inner surface (111) of the filter housing (11);
        wherein the compact louvered inner core member (142) has a truncated end truncated with respect to first filtering cottoned end surface (1412) such that the inner circumferential portions of filter media (141) adjacent the bypass valve (13) is free from flow restriction.

2. The filtering device of claim 1, wherein, wherein the central plate portion (131) of the bypass valve (13) pressingly abuts the first filtering cottoned end surface (1412) of the filter assembly (14).

3. The filtering device of claim 2, wherein the anti-drainback valve (15) is arranged in pressing contact with the second filtering cottoned end surface (1413) of the filter assembly (14), wherein the anti-drainback valve (15) includes an annular protruding portion (152) arranged around the valve hole (151), wherein the annular protruding portion (152) is insertable into the filter hole (1411) of the filter assembly (14).

4. The filtering device of claim 3, wherein the base plate (12) includes an annular groove (121) arranged around the threaded center hole (122), wherein the concaved surface of the annular groove (121) is perforated with a plurality of inlet holes (123).

5. The filtering device of claim 4, wherein the side wall (124) of the base plate (12) has a flange structure (125) defined thereon, wherein the filtering device further comprises an O-ring (16) disposed around the side wall (124) approximate the flange (125) for ensuring sealing engagement between the filter housing (11) and the base plate (12).

6. The filtering device of claim 5, wherein the bypass valve (13) comprises a pressure plate (133), a cover plate (134), a leaf spring member (135) and a bottom valve plate (136), wherein the cover plate (134) and the leaf spring member (135) are sandwiched between the pressure plate (133) and the bottom valve plate (136), wherein the pressure plate (133) is a substantially U-shaped structure having a central portion (1332) and a pair of extending portions (1331), wherein the extending portions (1331) establish pressing contact with the inner surface (111) of the filter housing (11), while the central portion (1332) establishes abutting contact with the top surface (1341) of the cover plate (134).

7. The filtering device of claim 6, wherein the bottom valve plate (136) has a step-like cavity (1361) defined on the central portion thereof, wherein the intermediate step portion thereof defines a supporting surface (1362) for supporting the leaf spring member (135), wherein the bottom surface (1342) of the cover plate (134) presses the two ends of the leaf spring member (135) onto the supporting surface (1362).

8. The filtering device of claim 6, wherein the bottom valve plate (136) has a plurality of perforated holes (1363) defined on the center portion thereof in alignment with the filter hole (1411) of the filter assembly (14), wherein the filter-facing side of the bottom valve plate (136) is protrudingly structured and insertable into the filter hole (1411).

9. The filtering device of claim 6, wherein the cover plate (134) is a substantially circular plate with at least one pair of radially extending protruding portions (1343) arranged on the circumference thereof, wherein the protruding portions (1343) firmly press the leaf spring member (135) onto the supporting surface (1362).

10. The filtering device of claim 6, wherein the leaf spring member (135) is elongated in shape.

11. The filtering device of claim 6, wherein the filter media (141) comprises a plurality of radially displaced and substantially equally spaced fin members (1414), wherein the other end abuttingly coupled to the annular protruding portion (152) of the anti-drainback valve (15) in alignment with the valve hole (151) thereof.

12. The filtering device of claim 11, wherein each pair of the neighboring fin members (1414) defines a fluid channel (1415) that provides fluid passage through the filter media (141).

13. The filtering device of claim 11, wherein the compact louvered inner core member (142) has a frame-like louvered structure (1421) insertable into the filter hole (1411) for providing structural support, wherein the louvered structure (1421) defines a plurality of louvered passages (1422) that enables fluid passage from the fluid channels (1415) to the filter hole (1411) of the filter assembly (14).

14. The filtering device of claim 6, further comprising a gasket (17) arranged in a gasket receiving groove (128) defined on the external surface (127) of the base plate (12) encircling the plurality of inlet holes (123).

* * * * *